US010138352B2

(12) United States Patent
Sumino et al.

(10) Patent No.: US 10,138,352 B2
(45) Date of Patent: Nov. 27, 2018

(54) FLUOROELASTOMER COMPOSITION AND MOLDED ARTICLE

(71) Applicant: DAIKIN INDUSTRIES, LTD., Osaka-Shi, Osaka (JP)

(72) Inventors: Eisaku Sumino, Osaka (JP); Tsuyoshi Noguchi, Osaka (JP); Satomi Uraoka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/505,271

(22) PCT Filed: Sep. 9, 2015

(86) PCT No.: PCT/JP2015/075566
§ 371 (c)(1),
(2) Date: Feb. 21, 2017

(87) PCT Pub. No.: WO2016/043100
PCT Pub. Date: Mar. 24, 2016

(65) Prior Publication Data

US 2017/0283585 A1 Oct. 5, 2017

(30) Foreign Application Priority Data

Sep. 16, 2014 (JP) ................................ 2014-187906

(51) Int. Cl.
*C08L 27/12* (2006.01)
*C08K 5/01* (2006.01)
*C08K 5/3432* (2006.01)
*C08K 5/3447* (2006.01)
*C08K 5/3437* (2006.01)
*F16J 15/02* (2006.01)

(52) U.S. Cl.
CPC .............. *C08K 5/3447* (2013.01); *C08K 5/01* (2013.01); *C08K 5/3437* (2013.01); *C08L 27/12* (2013.01); *C08K 5/3432* (2013.01); *F16J 15/022* (2013.01)

(58) Field of Classification Search
None
See application file for complete search history.

(56) References Cited

U.S. PATENT DOCUMENTS

| | | | | |
|---|---|---|---|---|
| 4,316,836 | A | 2/1982 | Aufdermarsh, Jr. | |
| 5,187,222 | A | 2/1993 | Abe et al. | |
| 6,642,300 | B1 | 11/2003 | Kawaguchi et al. | |
| 2003/0045623 | A1 | 3/2003 | Higashino et al. | |
| 2006/0235140 | A1 | 10/2006 | Tanaka et al. | |
| 2015/0094407 | A1 * | 4/2015 | Murai .................. | C09K 3/1009 524/90 |

FOREIGN PATENT DOCUMENTS

| | | | | |
|---|---|---|---|---|
| JP | 56-166251 | A | 12/1981 | |
| JP | 02-219848 | A | 9/1990 | |
| JP | 06-302527 | A | 10/1994 | |
| JP | 2013-216771 | A | 10/2013 | |
| WO | 00/64980 | A1 | 11/2000 | |
| WO | 01/32782 | A1 | 5/2001 | |
| WO | 2004/094527 | A1 | 11/2004 | |
| WO | WO-2013153871 | A1 * | 10/2013 | ........... C09K 3/1009 |

OTHER PUBLICATIONS

Communication dated Jan. 10, 2018, from the European Patent Office in counterpart European Application No. 15842406.9.
International Search Report of PCT/JP2015/075566 dated Nov. 24, 2015.
International Preliminary Report on Patentability with the translation of the Written Opinion dated Mar. 21, 2017 issued by the International Bureau in counterpart International Application No. PCT/JP2015/075566.

* cited by examiner

*Primary Examiner* — Richard A Huhn
(74) *Attorney, Agent, or Firm* — Sughrue Mion, PLLC

(57) ABSTRACT

The invention provides a fluoroelastomer composition excellent in heat resistance. The fluoroelastomer composition of the present invention contains a fluoroelastomer and a specific compound.

5 Claims, No Drawings

FLUOROELASTOMER COMPOSITION AND MOLDED ARTICLE

CROSS REFERENCE TO RELATED APPLICATIONS

This application is a National Stage of International Application No. PCT/JP2015/075566 filed Sep. 9, 2015, claiming priority based on Japanese Patent Application No. 2014-187906 filed Sep. 16, 2014, the contents of all of which are incorporated herein by reference in their entirety.

TECHNICAL FIELD

The present invention relates to fluoroelastomer compositions and molded articles.

BACKGROUND ART

Fluoroelastomers, particularly perfluoroelastomers containing a tetrafluoroethylene (TFE) unit, show excellent chemical resistance, solvent resistance, and heat resistance, and thus are widely used as, for example, sealants in severe environment such as in the fields of aerospace, semiconductor manufacturing devices, and chemical plants.

One known technique to improve the required characteristics of sealants is to add filler to fluoroelastomers.

In order to provide a seal for semiconductor manufacturing devices which has heat resistance, low gas permeability, and stability against plasma irradiation in oxygen or $CF_4$ atmosphere, and which does not generate dust, Patent Literature 1 proposes adding 1 to 50 parts by weight of silica and 1 to 10 parts by weight of an organic peroxide to 100 parts by weight of a fluoroelastomer.

In order to improve the plasma resistance and reduce generation of particles after plasma irradiation, Patent Literature 2 proposes adding fine particles of aluminum oxide having an average particle size of not greater than 0.5 μm to a crosslinkable fluoroelastomer component.

In order to provide a peroxide-vulcanizable fluoroelastomer white blend composition that does not impair the compression set, Patent Literature 3 proposes adding, to a fluoroelastomer, white carbon ultrafine particles the 4 to 5 wt % aqueous solution of which has a pH of 9 to 12.

In order to provide a fluoroelastomer composition which maintains heat resistance and processability under the environment where the workpiece is directly exposed to plasma, such as the inside of a dry-etching device, has little weight change by exposure to both fluorine plasma and oxygen plasma in the production step of a semiconductor, and does not generate foreign objects (particles) at these steps, Patent Literature 4 proposes adding, to a fluoroelastomer, at least one selected from the group consisting of isoindolinone pigments, quinacridone pigments, diketopyrrolopyrrole pigments, anthraquinone pigments, amine antioxidants, phenol antioxidants, sulfur antioxidants, and phosphorus antioxidants.

Patent Literature 5 discloses, as filler which has little weight change by oxygen plasma irradiation and $CF_4$ plasma irradiation, a filler containing a synthetic high molecular compound having an amide bond in the main chain or a synthetic high molecular compound having an imide bond in the main chain. The literature also discloses adding this filler to a crosslinkable elastomer.

CITATION LIST

Patent Literature

Patent Literature 1: JP H06-302527 A
Patent Literature 2: WO 01/032782
Patent Literature 3: JP H02-219848 A
Patent Literature 4: WO 2004/094527
Patent Literature 5: WO 00/64980

SUMMARY OF INVENTION

Technical Problem

The present invention provides a fluoroelastomer composition excellent in heat resistance.

Solution to Problem

The inventors performed studies on filler capable of improving the heat resistance of fluoroelastomer compositions to find that specific compounds which have never been examined have an effect of improving the heat resistance of fluoroelastomer compositions, completing the present invention.

Specifically, the present invention relates to a fluoroelastomer composition containing:

a fluoroelastomer; and at least one compound (a) selected from the group consisting of:

a compound (1) represented by the following formula (1):

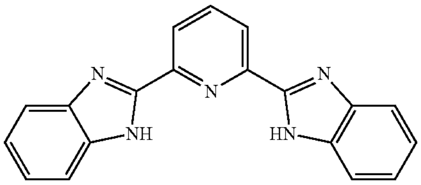 [SMILES: c1cc(-c2nc3ccccc3[nH]2)nc(-c2nc3ccccc3[nH]2)c1]

wherein an aromatic ring may be substituted;

a compound (2) represented by the following formula (2):

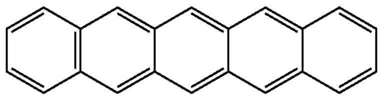 [SMILES: c1ccc2cc3cc4cc5ccccc5cc4cc3cc2c1]

wherein an aromatic ring may be substituted;

a compound (3) represented by the following formula (3):

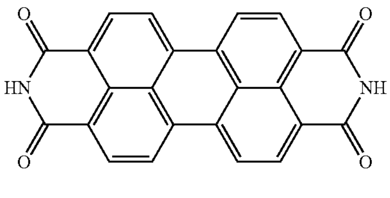 [SMILES: O=C1NC(=O)c2ccc3c4ccc5c6c(ccc(c7ccc1c2c73)c64)C(=O)NC5=O]

wherein an aromatic ring may be substituted;

a compound (4) represented by the following formula (4):

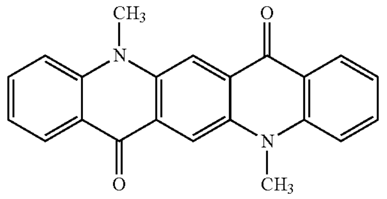 [SMILES: Cn1c2ccccc2c(=O)c2cc3c(cc21)c(=O)c1ccccc1n3C]

wherein an aromatic ring may be substituted; and a compound (5) represented by the following formula (5):

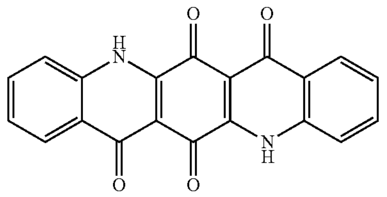 [SMILES: O=C1c2[nH]c3ccccc3c(=O)c2C(=O)c2[nH]c3ccccc3c(=O)c21]

wherein an aromatic ring may be substituted.

The fluoroelastomer is preferably a perfluoroelastomer.

The compound (a) is preferably contained in an amount of 0.5 to 100 parts by mass relative to 100 parts by mass of the fluoroelastomer.

The fluoroelastomer composition of the present invention is preferably a molding material.

The present invention also relates to a molded article obtainable from the above fluoroelastomer composition.

Advantageous Effects of Invention

Since having the aforementioned configuration, the fluoroelastomer composition of the present invention is excellent in heat resistance.

DESCRIPTION OF EMBODIMENTS

The present invention will be described in detail below.

The present invention relates to a fluoroelastomer composition containing a fluoroelastomer and a compound (a).

In the present invention, a fluoroelastomer is used because it has chemical resistance and heat resistance. The fluoroelastomer may be either a partially fluorinated elastomer or a perfluoroelastomer, and a perfluoroelastomer is preferred because it has better chemical resistance and heat resistance.

Examples of the partially fluorinated elastomer include vinylidene fluoride (VdF) fluororubber, tetrafluoroethylene (TFE)/propylene (Pr) fluororubber, tetrafluoroethylene (TFE)/propylene/vinylidene fluoride (VdF) fluororubber, ethylene/hexafluoropropylene (HFP) fluororubber, ethylene/hexafluoropropylene (HFP)/vinylidene fluoride (VdF) fluororubber, and ethylene/hexafluoropropylene (HFP)/tetrafluoroethylene (TFE) fluororubber. Preferred is at least one selected from the group consisting of vinylidene fluoride fluororubber and tetrafluoroethylene/propylene fluororubber.

The vinylidene fluoride fluororubber is preferably a copolymer containing 45 to 85 mol % of vinylidene fluoride and 55 to 15 mol % of at least one other monomer copolymerizable with the vinylidene fluoride. It is preferably a copolymer containing 50 to 80 mol % of vinylidene fluoride and 50 to 20 mol % of at least one other monomer copolymerizable with the vinylidene fluoride.

The amounts of the respective monomers constituting the fluoroelastomer herein can be calculated by any appropriate combination of NMR, FT-IR, elemental analysis, and X-ray fluorescence analysis in accordance with the types of the monomers.

Examples of the at least one other monomer copolymerizable with the vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, fluoromonomers represented by the formula (6): $CH_2{=}CFRf^{61}$ (wherein $Rf^{61}$ is a C1-C12 linear or branched fluoroalkyl group), fluoromonomers represented by the formula (7): $CH_2{=}CH{-}(CF_2)_n{-}X^2$ (wherein $X^2$ is H or F; and n is an integer of 3 to 10), and monomers giving a crosslinking site; and non-fluorinated monomers such as ethylene, propylene, and alkyl vinyl ethers. These monomers may be used alone or in any combination. Preferred is at least one selected from the group consisting of TFE, HFP, fluoroalkyl vinyl ethers, and CTFE.

The fluoroalkyl vinyl ethers are each preferably at least one selected from the group consisting of:

fluoromonomers represented by the formula (8):

$$CF_2{=}CF{-}ORf^{81}$$

(wherein $Rf^{81}$ is a C1-C8 perfluoroalkyl group);

fluoromonomers represented by the formula (10):

$$CF_2{=}CFOCF_2ORf^{101}$$

(wherein $Rf^{101}$ is a C1-C6 linear or branched perfluoroalkyl group, a C5-C6 cyclic perfluoroalkyl group, a C2-C6 linear or branched perfluorooxyalkyl group having 1 to 3 oxygen atoms); and fluoromonomers represented by the formula (11):

$$CF_2{=}CFO(CF_2CF(Y^{11})O)_m(CF_2)_nF$$

(wherein $Y^{11}$ is a fluorine atom or a trifluoromethyl group; m is an integer of 1 to 4; and n is an integer of 1 to 4). The fluoroalkyl vinyl ethers are more preferably fluoromonomers represented by the formula (8).

Specific examples of the vinylidene fluoride fluororubber include VdF/HFP rubber, VdF/HFP/TFE rubber, VdF/CTFE rubber, VdF/CTFE/TFE rubber, rubber of VDF and a fluoromonomer represented by the formula (6), rubber of VDF, a fluoromonomer represented by the formula (6), and TFE, VDF/perfluoro(methyl vinyl ether) (PMVE) rubber, VDF/PMVE/TFE rubber, and VDF/PMVE/TFE/HFP rubber. The rubber of VDF and a fluoromonomer represented by the formula (6) is preferably VDF/$CH_2{=}CFCF_3$ rubber, and the rubber of VDF, a fluoromonomer represented by the formula (6), and TFE is preferably VDF/TFE/$CH_2{=}CFCF_3$ rubber.

The VDF/$CH_2{=}CFCF_3$ rubber is preferably a copolymer containing 40 to 99.5 mol % of VDF and 0.5 to 60 mol % of $CH_2{=}CFCF_3$, more preferably a copolymer containing 50 to 85 mol % of VDF and 20 to 50 mol % of $CH_2{=}CFCF_3$.

The tetrafluoroethylene/propylene fluororubber is preferably a copolymer containing 45 to 70 mol % of tetrafluoroethylene, 55 to 30 mol % of propylene, and 0 to 5 mol % of a fluoromonomer giving a crosslinking site.

The fluoroelastomer may be a perfluoroelastomer. The perfluoroelastomer is preferably a TFE-containing perfluoroelastomer, for example, at least one selected from the group consisting of copolymers of TFE and a fluoromonomer represented by the formula (8), (10), or (11) and copolymers of TFE, a fluoromonomer represented by the formula (8), (10), or (11), and a monomer giving a crosslinking site.

In the case of a TFE/PMVE copolymer, the composition thereof is preferably (45 to 90)/(10 to 55) (mol %), more preferably (55 to 80)/(20 to 45), still more preferably (55 to 70)/(30 to 45).

In the case of a copolymer of TFE/PMVE/a monomer giving a crosslinking site, the composition thereof is preferably (45 to 89.9)/(10 to 54.9)/(0.01 to 4) (mol %), more preferably (55 to 77.9)/(20 to 49.9)/(0.1 to 3.5), still more preferably (55 to 69.8)/(30 to 44.8)/(0.2 to 3).

In the case of a copolymer of TFE/a C4-C12 fluoromonomer represented by the formula (8), (10), or (11), the composition thereof is preferably (50 to 90)/(10 to 50) (mol %), more preferably (60 to 88)/(12 to 40), still more preferably (65 to 85)/(15 to 35).

In the case of a copolymer of TFE/a C4-C12 fluoromonomer represented by the formula (8), (10), or (11)/a monomer giving a crosslinking site, the composition thereof is preferably (50 to 89.9)/(10 to 49.9)/(0.01 to 4) (mol %), more preferably (60 to 87.9)/(12 to 39.9)/(0.1 to 3.5), still more preferably (65 to 84.8)/(15 to 34.8)/(0.2 to 3).

If the composition is outside the above range, the copolymer tends to lose the properties as rubber elastic body and to have properties similar to resin.

The perfluoroelastomer is preferably at least one selected from the group consisting of copolymers of TFE, a fluoromonomer represented by the formula (11), and a fluoromonomer giving a crosslinking site, copolymers of TFE and a perfluorovinyl ether represented by the formula (11), copolymers of TFE and a fluoromonomer represented by the formula (8), and copolymers of TFE, a fluoromonomer represented by the formula (8), and a monomer giving a crosslinking site.

The perfluoroelastomer may also be selected from perfluoroelastomers disclosed in WO 97/24381, JP S61-57324 B, JP H04-81608 B, JP H05-13961 B, and the like.

The monomer giving a crosslinking site is a monomer (cure-site monomer) having a crosslinkable group that gives a fluoropolymer a crosslinking site for forming a crosslink by a curing agent.

The monomer giving a crosslinking site is preferably at least one selected from the group consisting of: fluoromonomers represented by the formula (12):

$$CX^3_2{=}CX^3{-}R_f^{121}CHR^{121}X^4$$

(wherein $X^3$ is a hydrogen atom, a fluorine atom or $CH_3$; $R_f^{121}$ is a fluoroalkylene group, a perfluoroalkylene group, a fluoro(poly)oxyalkylene group, or a perfluoro(poly)oxyalkylene group; $R^{121}$ is a hydrogen atom or $CH_3$; and $X^4$ is an iodine atom or a bromine atom); fluoromonomers represented by the formula (13):

$$CX^3_2{=}CX^3{-}R_f^{131}X^4$$

(wherein $X^3$ is a hydrogen atom, a fluorine atom, or $CH_3$; $R_f^{131}$ is a fluoroalkylene group, a perfluoroalkylene group, a fluoropolyoxyalkylene group, or a perfluoropolyoxyalkylene group; and $X^4$ is an iodine atom or a bromine atom); fluoromonomers represented by the formula (14):

$$CF_2{=}CFO(CF_2CF(CF_3)O)_m(CF_2)_n{-}X^5$$

(wherein m is an integer of 0 to 5; n is an integer of 1 to 3; and $X^5$ is a cyano group, a carboxyl group, an alkoxycarbonyl group, an iodine atom, a bromine atom, or $-CH_2I$); fluoromonomers represented by the formula (15):

$$CH_2{=}CFCF_2O(CF(CF_3)CF_2O)_m(CF(CF_3))_n{-}X^6$$

(wherein m is an integer of 0 to 5; n is an integer of 1 to 3; and $X^6$ is a cyano group, a carboxyl group, an alkoxycarbonyl group, an iodine atom, a bromine atom, or $-CH_2OH$); and monomers represented by the formula (16):

$$CR^{162}R^{163}{=}CR^{164}{-}Z{-}R^{165}{=}CR^{166}R^{167}$$

(wherein $R^{162}$, $R^{163}$, $R^{164}$, $R^{165}$, $R^{166}$, and $R^{167}$ may be the same as or different from each other, and are each a hydrogen atom or a C1-C5 alkyl group; and Z is a linear or branched group optionally having an oxygen atom and is a C1-C18 alkylene group, a C3-C18 cycloalkylene group, a C1-C10 at least partially fluorinated alkylene or oxyalkylene group, or a (per)fluoropolyoxyalkylene group having a molecular weight of 500 to 10000 and represented by the formula:

$$-(Q)_p-CF_2O-(CF_2CF_2O)_m(CF_2O)_n-CF_2-(Q)_p-$$

(wherein Q is an alkylene group or an oxyalkylene group; p is 0 or 1; and m/n is 0.2 to 5).

$X^3$ is preferably a fluorine atom. $Rf^{121}$ and $Rf^{131}$ are each preferably a C1-C5 perfluoroalkylene group. $R^{121}$ is preferably a hydrogen atom. $X^5$ is preferably a cyano group, an alkoxycarbonyl group, an iodine atom, a bromine atom, or $-CH_2I$. $X^6$ is preferably a cyano group, an alkoxycarbonyl group, an iodine atom, a bromine atom, or $-CH_2OH$.

The monomer giving a crosslinking site is preferably at least one selected from the group consisting of $CF_2{=}CFOCF_2CF(CF_3)OCF_2CF_2CN$, $CF_2{=}CFOCF_2CF(CF_3)OCF_2CF_2COOH$, $CF_2{=}CFOCF_2CF(CF_3)OCF_2CF_2CH_2I$, $CF_2{=}CFOCF_2CF_2CH_2I$, $CH_2{=}CFCF_2OCF(CF_3)CF_2OCF(CF_3)CN$, $CH_2{=}CFCF_2OCF(CF_3)CF_2OCF(CF_3)COOH$, $CH_2{=}CFCF_2OCF(CF_3)CF_2OCF(CF_3)CH_2OH$, $CH_2{=}CHCF_2CF_2I$, $CH_2{=}CH(CF_2)_2CH{=}CH_2$, $CH_2{=}CH(CF_2)_6CH{=}CH_2$, and $CF_2{=}CFO(CF_2)_5CN$, more preferably at least one selected from the group consisting of $CF_2{=}CFOCF_2CF(CF_3)OCF_2CF_2CN$ and $CF_2{=}CFOCF_2CF_2CH_2I$.

For excellent compression set characteristics at high temperature, the fluoroelastomer preferably has a glass transition temperature of −70° C. or higher, more preferably −60° C. or higher, still more preferably −50° C. or higher. For good cold resistance, the glass transition temperature is preferably 5° C. or lower, more preferably 0° C. or lower, still more preferably −3° C. or lower.

The glass transition temperature can be determined by heating 10 mg of a sample at 10° C./min using a differential scanning calorimeter (DSC822e, Mettler-Toledo International Inc.) to provide a DSC curve, and then determining the middle point of two intersection points of the extended base line of the DSC curve before and after the second transition and the tangent at the point of inflection of the DSC curve. The temperature indicated by this middle point is defined as the glass transition temperature.

For good heat resistance, the fluoroelastomer preferably has a Mooney viscosity ML(1+20) at 170° C. of 30 or higher, more preferably 40 or higher, still more preferably 50 or higher. For good processability, this Mooney viscosity is preferably 150 or lower, more preferably 120 or lower, still more preferably 110 or lower.

For good heat resistance, the fluoroelastomer preferably has a Mooney viscosity ML(1+20) at 140° C. of 30 or higher, more preferably 40 or higher, still more preferably 50 or higher. For good processability, this Mooney viscosity is preferably 180 or lower, more preferably 150 or lower, still more preferably 110 or lower.

For good heat resistance, the fluoroelastomer preferably has a Mooney viscosity ML(1+10) at 100° C. of 10 or higher, more preferably 20 or higher, still more preferably 30 or higher. For good processability, this Mooney viscosity is preferably 120 or lower, more preferably 100 or lower, still more preferably 80 or lower.

The Mooney viscosity can be determined at 170° C., 140° C., or 100° C. using a Mooney viscometer MV2000E (Alpha Technologies Inc.) in conformity with JIS K6300.

The fluoroelastomer composition of the present invention further contains a compound (a) as an organic filler. This leads to excellent heat resistance of the fluoroelastomer composition of the present invention. This also improves the compression set characteristics and heat resistance of a molded article obtainable from the fluoroelastomer composition of the present invention. Containing the compound (a) also leads to an increased hardness of the resulting molded article, providing an effect of improving the chalking resistance.

The compound (a) is at least one compound selected from the group consisting of:

a compound (1) represented by the formula (1):

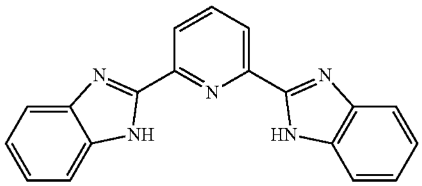 [SMILES: c1cc(-c2nc3ccccc3[nH]2)nc(-c2nc3ccccc3[nH]2)c1]

(wherein an aromatic ring may be substituted);

a compound (2) represented by the formula (2):

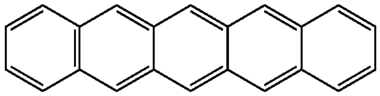 [SMILES: c1ccc2cc3cc4cc5ccccc5cc4cc3cc2c1]

(wherein an aromatic ring may be substituted);

a compound (3) represented by the formula (3):

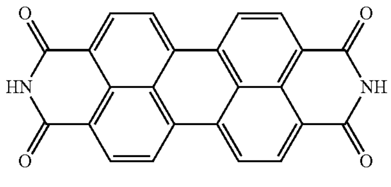 [SMILES: O=C1NC(=O)c2ccc3c4ccc5c6c(ccc(c7ccc1c2c73)c64)C(=O)NC5=O]

(wherein an aromatic ring may be substituted);

a compound (4) represented by the formula (4):

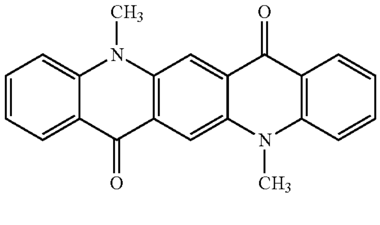 [SMILES: Cn1c2ccccc2c(=O)c2cc3c(cc21)c(=O)c1ccccc1n3C]

(wherein an aromatic ring may be substituted); and a compound (5) represented by the formula (5):

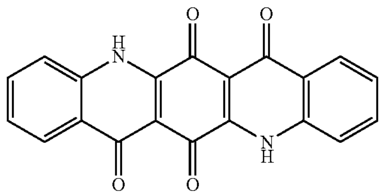 [SMILES: O=C1c2[nH]c3ccccc3c(=O)c2C(=O)c2[nH]c3ccccc3c(=O)c21]

(wherein an aromatic ring may be substituted). For excellent compression set characteristics and heat resistance of the resulting molded article, the compound (a) is preferably at least one compound selected from the group consisting of the compound (1) and the compound (2).

These compounds (a) may be used alone or in admixture of two or more.

The compound (a) may be in any shape, such as not only a spherical shape but also a scaly shape. The compound in a spherical shape can provide a molded article with less anisotropy, while the compound in a scaly shape can provide a molded article with reinforcibility in a specific direction.

The compound (a) preferably has a specific surface area of 0.5 $m^2/g$ or larger, more preferably 2 $m^2/g$ or larger. The compound having a specific surface area smaller than 0.5 $m^2/g$ may cause poor reinforcibility.

The specific surface area is a value determined using a surface analyzer in conformity with the BET method.

The compound (a) is added in an amount of preferably 0.5 to 100 parts by mass, more preferably 5 to 50 parts by mass, still more preferably 5 to 25 parts by mass, relative to 100 parts by mass of the fluoroelastomer. Less than 0.5 parts by mass of the compound (a) may cause poor reinforcibility, while more than 100 parts by mass of the compound (a) may cause a hard molded article with impaired sealability.

For the required cleanliness (the state of containing no metal) of sealants for semiconductor manufacturing devices, the compound (a) is preferably free from metal atoms.

The fluoroelastomer composition of the present invention may further contain common filler.

Examples of the common filler include engineering plastic-derived organic fillers (excluding the compound (a)) such as imide fillers having an imide structure (e.g., polyimide, polyamide imide, and polyether imide), polyarylate, polysulfone, polyethersulfone, polyphenylenesulfide, polyether ether ketone, polyether ketone, and polyoxybenzoate; and inorganic fillers such as metal oxide fillers (e.g., aluminum oxide, silicon oxide, and yttrium oxide), metal carbide (e.g., silicon carbide and aluminum carbide), metal nitride fillers (e.g., silicon nitride and aluminum nitride), aluminum fluoride, and carbon fluoride.

For the effect of shielding a variety of plasma, preferred among these are aluminum oxide, yttrium oxide, silicon oxide, polyimide, and carbon fluoride.

These inorganic fillers and organic fillers may be used alone or in combination of two or more.

The common filler is blended in an amount of preferably 0.5 to 100 parts by mass, more preferably 5 to 50 parts by mass, relative to 100 parts by mass of the fluoroelastomer.

The fluoroelastomer composition of the present invention may further contain a crosslinker.

The crosslinker may be any one which is usually used as a crosslinker for fluoroelastomers. In view of the heat resistance of the resulting molded article, the crosslinker is preferably a triazine-crosslinking crosslinker, an oxazole-crosslinking crosslinker, an imidazole-crosslinking crosslinker, or a thiazole-crosslinking crosslinker.

Examples of the triazine-crosslinking crosslinker include organotin compounds such as tetraphenyltin and triphenyltin, and inorganic nitrides such as silicon nitride ($Si_3N_4$), lithium nitride, titanium nitride, aluminum nitride, boron nitride, vanadium nitride, and zirconium nitride.

Examples of the oxazole-crosslinking crosslinker, the imidazole-crosslinking crosslinker, and the thiazole-crosslinking crosslinker include:

bisdiaminophenyl crosslinkers, bisaminophenol crosslinkers, and bisaminothiophenol crosslinkers represented by the formula (20):

(20)

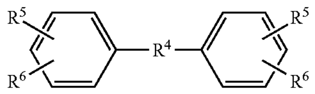

(wherein $R^4$ is —$SO_2$—, —O—, —CO—, a C1-C6 alkylene group, a C1-C10 perfluoroalkylene group, a single bond, or a group represented by the following formula:

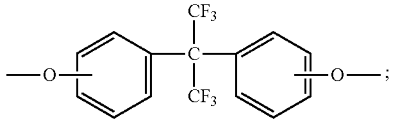

one of $R^5$ and $R^6$ is —$NH_2$ and the other is —$NHR^7$, —$NH_2$, —OH, or —SH; $R^7$ is a hydrogen atom, a fluorine atom, or a monovalent organic group; preferably, $R^5$ is —$NH_2$ and $R^6$ is —$NHR^7$; preferred specific examples of the C1-C6 alkylene group include a methylene group, an ethylene group, a propylene group, a butylene group, a pentylene group, and a hexylene group; examples of the C1-C10 perfluoroalkylene group include a group represented by the following formula:

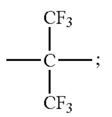

these compounds are known as examples of bisdiaminophenyl compounds in, for example, JP H02-59177 B and JP H08-120146 A);

bisamidrazone crosslinkers represented by the formula (21):

(21)

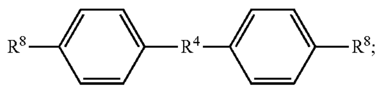

(wherein $R^4$ is defined in the same manner as mentioned above; and $R^8$ is

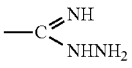 or 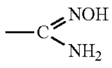 )

and bisamidoxime crosslinkers represented by the formula (22):

(22)

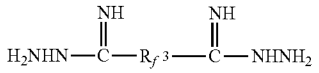

(wherein $R_f^3$ is a C1-C10 perfluoroalkylene group) or the formula (23):

(23)

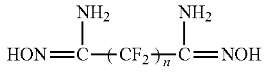

(wherein n is an integer of 1 to 10). These bisaminophenol crosslinkers, bisaminothiophenol crosslinkers, or bisdiaminophenyl crosslinkers are conventionally used for crosslinking systems where a cyano group serves as a crosslinking point. Further, these crosslinkers also react with a carboxyl group and an alkoxycarbonyl group to form an oxazole ring, thiazole ring, or imidazole ring, providing a crosslinked article.

Particularly preferred examples of the crosslinker include compounds having multiple 3-amino-4-hydroxyphenyl or 3-amino-4-mercapto phenyl groups and compounds represented by the formula (24):

(24)

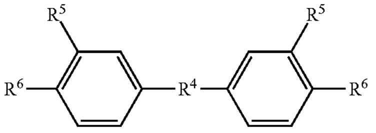

(wherein $R^4$, $R^5$, and $R^6$ are defined in the same manner as mentioned above). Specific examples thereof include 2,2-bis(3-amino-4-hydroxyphenyl)hexafluoropropane (general name: bis(aminophenol) AF), 2,2-bis(3-amino-4-mercaptophenyl)hexafluoropropane, tetraaminobenzene, bis-3,4-diaminophenylmethane, bis-3,4-diaminophenyl ether, 2,2-bis(3,4-diaminophenyl)hexafluoropropane, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl]hexafluoropropane, and 2,2-bis[3-amino-4-(N-benzylamino)phenyl]hexafluoropropane.

In view of the heat resistance, steam resistance, amine resistance, and good crosslinkability, the crosslinker is preferably 2,2-bis[3-amino-4-(N-phenylamino)phenyl]hexafluoropropane.

The fluoroelastomer composition of the present invention may contain another crosslinker in addition to the above crosslinker.

Examples of the crosslinker other than the aforementioned crosslinker include peroxide crosslinkers, polyol crosslinkers, and polyamine crosslinkers.

The crosslinker used in peroxide crosslinking may be any organic peroxide that can easily generate peroxy radicals in the presence of heat or a redox system. Specific examples thereof include 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropyl benzene, 2,5-dimethyl-2,5-di(t-butylperoxy)hexane, 2,5-dimethyl-2,5-di(t-butylperoxy)-hexyne-3, benzoyl peroxide, t-butyl peroxy benzene, 2,5-dimethyl-2,5-di(benzoylperoxy)hexane, t-butyl peroxy maleic acid, and t-butyl peroxy isopropyl carbonate. The type and amount of the organic peroxide is usually selected in consideration of factors such as the amount of active —O—O— and the decomposition temperature.

A cross-linking aid to be used in this case may be a compound having reaction activity with peroxy radicals and polymer radicals, and examples thereof include polyfunctional compounds having functional groups such as $CH_2{=}CH-$, $CH_2{=}CHCH_2-$, and $CF_2{=}CF-$. Specific examples thereof include triallyl cyanurate, triallyl isocyanurate (TAIC), triacrylformal, triallyl trimellitate, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-diallyl acrylamide, and 1,6-divinyl dodecafluorohexane.

Examples of the crosslinker used in polyol crosslinking include polyhydric alcohol compounds such as bisphenol A and bisphenol AF.

Examples of the crosslinker used in polyamine crosslinking include polyvalent amine compounds such as hexamethylene diamine carbamate, N,N'-dicinnamylidene-1,6-hexane diamine, and 4,4'-bis(aminocyclohexyl)methane carbamate.

The crosslinker is used in an amount of preferably 0.05 to 10 parts by mass, more preferably 0.5 to 5 parts by mass, relative to 100 parts by mass of the fluoroelastomer. Less than 0.05 parts by mass of the crosslinker tends to cause insufficient crosslinking of the fluoroelastomer, while more than 10 parts by mass thereof tends to impair the physical properties of a crosslinked article.

In the field not requiring high purity and non-staining, any usual additives such as filler, processing aids, plasticizers, and colorants may be added to the fluoroelastomer composition, if necessary. Further, one or more common cross-linkers or cross-linking aids other than those mentioned above may be added.

The fluoroelastomer composition of the present invention can be prepared by mixing the above components using a usual elastomer processing machine, such as an open roll mill, a Banbury mixer, or a kneader. Alternatively, the fluoroelastomer composition may be prepared by a method using a closed mixer. The fluoroelastomer composition of the present invention can be suitably used as a molding material to be crosslink-molded into a molded article.

A method of processing the fluoroelastomer composition of the present invention as a molding material into a preform may be a usual method, and examples of such a method include known methods such as a method of heat-compressing the composition in a mold, a method of injecting the composition into a heated mold, and a method of extruding the composition using an extruder. In the case of extruded products such as hoses and electric wires, such molded articles can be produced by heat-crosslinking the extrudate with steam, for example.

The cross-linking conditions are as follows.

(Standard Composition)

Fluoroelastomer: 100 parts by mass

Crosslinker (2,2-bis[3-amino-4-(N-phenylamino)phenyl]hexafluoropropane): 1 part by mass Compound: 15 parts by mass (Standard Crosslinking Conditions)

Kneading method: roll kneading

Press crosslinking: 180° C., 20 minutes

Oven crosslinking: 290° C., 18 hours

The crosslinking is performed under these conditions unless otherwise mentioned.

The present invention also relates to a molded article obtainable from the fluoroelastomer composition.

The molded article of the present invention can be suitably used as a sealant for semiconductor manufacturing devices requiring especially high-level cleanliness, particularly semiconductor manufacturing devices where high-density plasma irradiation is performed. Examples of the sealant include O-rings, square-rings, gaskets, packings, oil seals, bearing seals, and lip seals.

The molded article may also be used as various elastomer products, such as diaphragms, tubes, hoses, rubber rolls, and belts, used in semiconductor manufacturing devices. The molded article may also be used as a coating material or a lining material.

The "semiconductor manufacturing devices" used herein are not limited to devices for manufacturing semiconductors, but widely include the whole series of devices used in the field of semiconductors requiring high-level cleanliness, such as devices for manufacturing liquid crystal panels or plasma panels. Examples thereof include the following.

(1) Etching Devices
- Dry etching devices
- Plasma etching devices
- Reactive ion etching devices
- Reactive ion beam etching devices
- Sputter etching devices
- Ion beam etching devices
- Wet etching devices
- Ashing devices (2) Cleaning Devices
- Dry etching cleaning devices
- $UV/O_3$ cleaning devices
- Ion beam cleaning devices
- Laser beam cleaning devices
- Plasma cleaning devices
- Gas etching cleaning devices
- Extraction cleaning devices
- Soxhlet's extraction cleaning devices
- High-temperature high-pressure extraction cleaning devices
- Microwave extraction cleaning devices
- Supercritical extraction cleaning devices (3) Exposure Devices
- Steppers
- Coaters and developers (4) Polishing Devices
- CMP devices (5) Film-Forming Devices
- CVD devices
- Sputtering devices (6) Diffusion and Ion Implantation Devices
- Oxidation diffusion devices
- Ion implantation devices The molded article of the present invention exerts excellent performance as a sealant for CVD devices, plasma etching devices, reactive ion etching devices, ashing devices, or excimer laser exposure devices, for example. The molded article of the present invention is also expected to have excellent features such as less organic outgassing and a small metal content.

EXAMPLES

The present invention is described with reference to, but not limited to, examples.

(Determination of Compression Set)

The compression sets in the examples and comparative examples were determined in conformity with JIS-K6262 using secondary-oven-crosslinked O-rings obtained in the respective examples and comparative examples. Specifically, each of the secondary-oven-crosslinked O-rings obtained in the respective examples and comparative examples was held under 25% compression at 300° C. for 70 hours, and then left to stand in a 25° C. temperature-constant chamber for 30 minutes. Using this sample, the compression set was determined.

(50% Mass Reduction Temperature)

The mass change was measured using a thermogravimetric analyzer (TG-DTA6200, Seiko Instruments Inc.) in the air (200 ml/min) at a temperature-increasing rate of 10° C./min within a temperature range of 20° C. to 600° C. Then, the temperature at which the mass reduction reached 50% was determined.

Example 1

First, 100 parts by mass of the fluoroelastomer, 1 part by mass of Crosslinker 1, and 15 parts by mass of Compound 1 were premixed in 900 parts by mass of a fluorine-containing solvent. Then, the fluorine-containing solvent was volatilized at 60° C. and the remaining components were kneaded using an open roll mill, providing a crosslinkable fluoroelastomer composition. In Table 1, the fluoroelastomer is a fluoroelastomer containing tetrafluoroethylene (TFE), perfluoromethyl vinyl ether (PMVE), and CNVE ($CF_2{=}CFOCF_2CF(CF_3)OCF_2CF_2CN$) as a crosslinking group (TFE/PMVE/CNVE=59.5/39.5/1.0 (mol %)); Crosslinker 1 is 2,2-bis-[3-amino-4-(N-phenylamino)phenyl]hexafluoropropane, and Compound 1 is 2,6-bis(2-benzimidazolyl)pyridine. The fluorine-containing solvent used was R-318 (Daikin Industries, Ltd., main component: $C_4F_8Cl_2$)

The resulting fluoroelastomer composition was press-crosslinked at 180° C. for 20 minutes, and then oven-crosslinked in a 290° C. air oven for 18 hours, providing an O-ring crosslinked molded article.

With the O-ring crosslinked molded article, the compression set was determined. Table 1 shows the results.

Example 2 and Comparative Example 1

An O-ring crosslinked molded article and a comparative O-ring crosslinked molded article were provided in the same manner as in Example 1 except that the components of the fluoroelastomer compositions were changed as shown in Table 1. Table 1 shows the results of determining the compression sets. In Table 1, Compound 2 is pentacene and Compound 6 is polyimide powder (UIP-S, Ube Industries, Ltd.).

Examples 3 to 7 and Comparative Examples 2 and 3

Fluoroelastomer compositions were provided in the same manner as in Example 1 except that the components of the fluoroelastomer compositions were changed as shown in Table 2. With each of the resulting fluoroelastomer compositions, the 50% mass reduction temperature was determined. Table 2 shows the results. In Table 2, Compound 3 is 3,4,9,10-perylene tetracarboxylic acid diimide, Compound 4 is N,N'-dimethyl quinacridone, and Compound 5 is quinacridonequinone. In Table 2, the fluoroelastomer, Compound 1, Compound 2, and Compound 6 are the same as those in Table 1.

TABLE 1

| | | Example 1 | Example 2 | Comparative Example 1 |
|---|---|---|---|---|
| Composition (parts by mass) | Fluoroelastomer | 100 | 100 | 100 |
| | Crosslinker 1 | 1 | 1 | 1 |
| | Compound 1 | 15 | | |
| | Compound 2 | | 15 | |
| | Compound 6 | | | 15 |
| Compression set (%) | | 38 | 35 | 43 |

TABLE 2

| | | Example 3 | Example 4 | Example 5 | Example 6 | Example 7 | Comparative Example 2 | Comparative Example 3 |
|---|---|---|---|---|---|---|---|---|
| Composition (parts by mass) | Fluoroelastomer | 100 | 100 | 100 | 100 | 100 | 100 | 100 |
| | Compound 1 | 1 | | | | | | |
| | Compound 2 | | 1 | | | | | |
| | Compound 3 | | | 1 | | | | |
| | Compound 4 | | | | 1 | | | |
| | Compound 5 | | | | | 1 | | |
| | Compound 6 | | | | | | 1 | |
| 50% Mass reduction temperature (° C.) | | 471.9 | 472.5 | 469.8 | 465.5 | 463.9 | 460.7 | 457.0 |

Example 8 and Comparative Example 4

Fluoroelastomer compositions were provided in the same manner as in Example 1 except that the components of the fluoroelastomer compositions were changed as shown in Table 3. An O-ring crosslinked molded article and a comparative O-ring crosslinked molded article were formed from the resulting fluoroelastomer compositions in the same manner as in Example 1. With each of the resulting O-ring crosslinked molded articles, the compression set and the 50% mass reduction temperature were determined. Table 3 shows the results of determining the compression set and the 50% mass reduction temperature. In Table 3, Crosslinker 2 is $Si_3N_4$. In Table 3, the fluoroelastomer, Compound 1, and Compound 6 are the same as those in Table 1.

TABLE 3

| | | Example 8 | Comparative Example 4 |
|---|---|---|---|
| Composition (parts by mass) | Fluoroelastomer | 100 | 100 |
| | Crosslinker 2 | 1 | 1 |
| | Compound 1 | 1 | |
| | Compound 6 | | 1 |
| Compression set (%) | | 25 | 57 |
| 50% Mass reduction temperature (° C.) | | 471.0 | 460.2 |

The O-ring crosslinked molded articles of Examples 1 and 2 were found to have better compression set characteristics, which serve as a barometer of sealability, than the comparative O-ring crosslinked molded article of Comparative Example 1.

The fluoroelastomer compositions of Examples 3 to 7 were found to have a higher 50% mass reduction temperature, and thus have better heat resistance, than the fluoroelastomer compositions of Comparative Examples 2 and 3.

The O-ring crosslinked molded article of Example 8 was found to have better compression set characteristics, which serves as a barometer of sealability, and a higher 50% mass reduction temperature, and thus have better heat resistance, than the comparative O-ring crosslinked molded article of Comparative Example 4.

These results therefore confirm the technical significance of the configuration of the fluoroelastomer composition of the present invention.

The invention claimed is:

1. A fluoroelastomer composition comprising:

a fluoroelastomer; and at least one compound (a) selected from the group consisting of:

a compound (1) represented by the following formula (1):

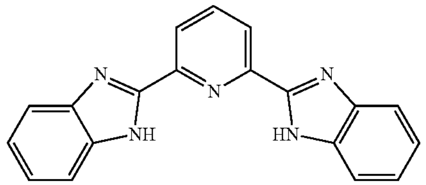 [SMILES: c1cc(-c2nc3ccccc3[nH]2)nc(-c2nc3ccccc3[nH]2)c1]

wherein an aromatic ring may be substituted; and a compound (2) represented by the following formula (2):

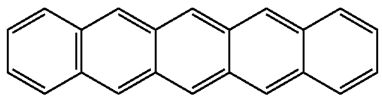 [SMILES: c1ccc2cc3cc4cc5ccccc5cc4cc3cc2c1]

wherein an aromatic ring may be substituted.

2. The fluoroelastomer composition according to claim 1, wherein the fluoroelastomer is a perfluoroelastomer.

3. The fluoroelastomer composition according to claim 1, wherein the compound (a) is contained in an amount of 0.5 to 100 parts by mass relative to 100 parts by mass of the fluoroelastomer.

4. The fluoroelastomer composition according to claim 1, which is a molding material.

5. A molded article obtainable from the fluoroelastomer composition according to claim 1.

* * * * *